Feb. 15, 1949.   G. A. NORMAN   2,461,656
FLUSHING DEVICE
Filed Sept. 9, 1946
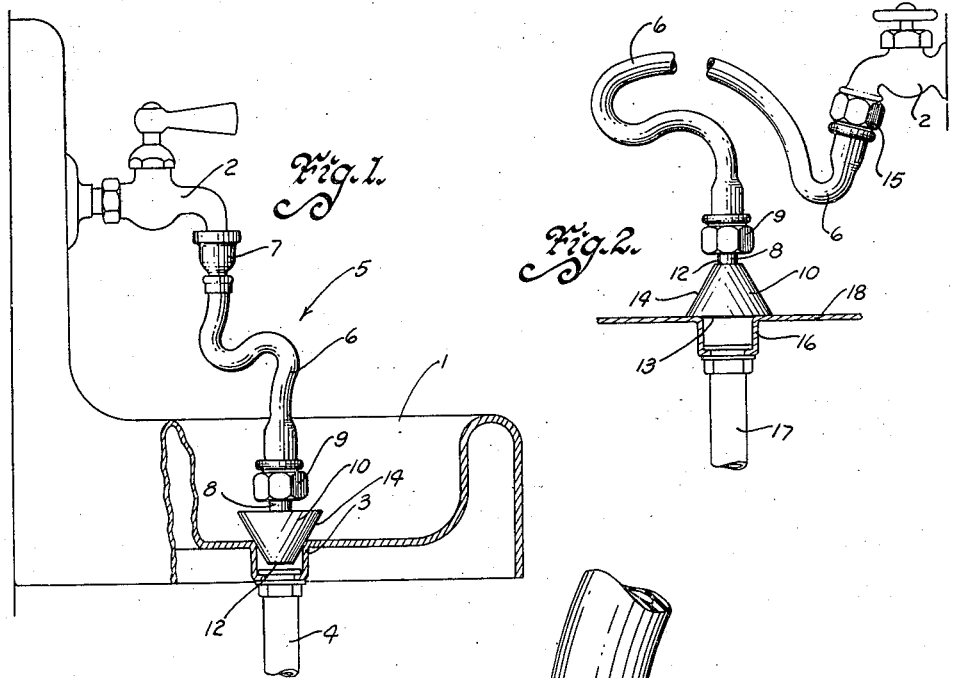
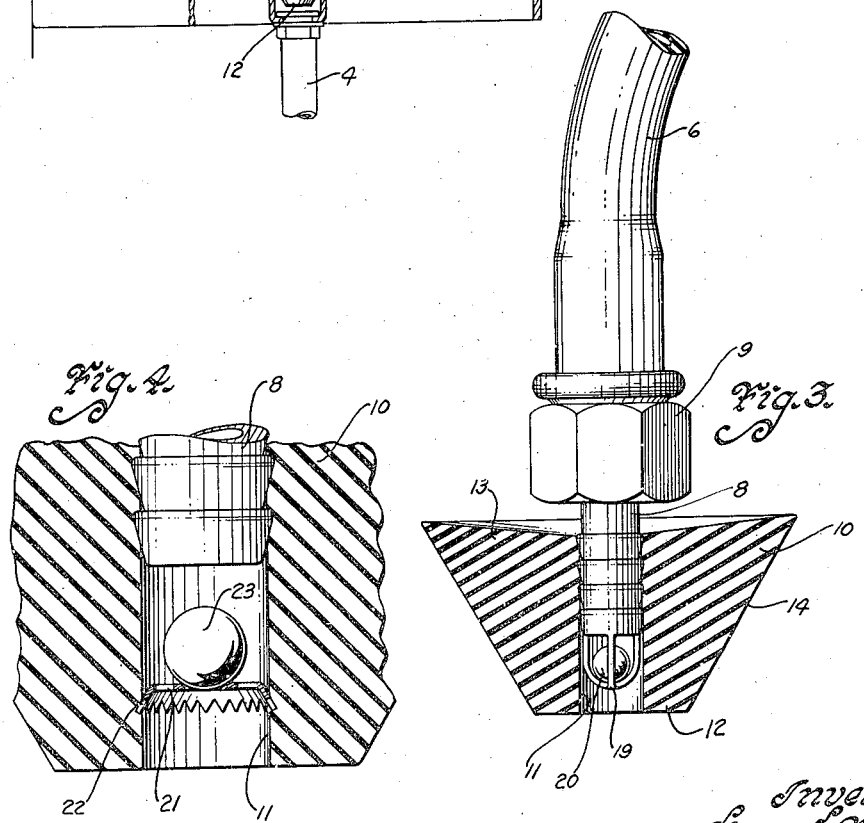
Inventor
Glenn A. Norman
by Harry L. Yunger
Attorney
Witness
Edward P. Seeley Patented Feb. 15, 1949

2,461,656

UNITED STATES PATENT OFFICE 2,461,656

FLUSHING DEVICE

Glenn A. Norman, Des Moines, Iowa

Application September 9, 1946, Serial No. 695,699

1 Claim. (Cl. 285—90)

This invention relates to a coupling member to connect with a source of fluid under pressure, such as a faucet of a city water supply system connected to a water supply conduit, and a second conduit, such as a sewer pipe, to direct the fluid under pressure into the second conduit to force any obstruction in the conduit therethrough.

Many drain flushing devices or testing devices have been manufactured and sold using the pressure of water flowing in the conduits of a city water supply system as a pressure force to move an obstruction out of a sewer conduit. There is very little problem in sealing and making a suitable connection with a faucet; but the coupling or connection between a sink or drain inlet into a sewer pipe causes some difficulty. Some structures use a cross-bar in the drain to make a rigid connection and draw a sealing member into sealing engagement with the sink. Most of these devices function all right so long as the outlet from a sink is in the center thereof. If the outlet occurs in the sides or corners of the sink, trouble occurs in making a seal.

It is an object of the invention among others to provide a coupling member to conduct a fluid under pressure from one conduit to a second conduit to remove an obstruction from the second conduit wherein the coupling member provides a seal with each conduit that reduces leakage to a minimum; a coupling member having one end thereof reversible to provide for different locations and types of a second conduit; a coupling member that is simple in construction and hence easy to manufacture, simple to assemble between a conduit carrying a fluid under pressure and a second conduit having an obstruction therein; a coupling member that is economical in construction and durable, economical and long lasting in operation; and a coupling means that is easy to operate after assembly between two conduits.

In carrying out the objects of the invention there is provided a coupling member to conduct a fluid under pressure from one conduit to a second conduit which coupling member includes a flexible hose. There are means on one end of the flexible hose to join the coupling member to a conduit supplying fluid under pressure while on the other end of the flexible hose is connected a fitting having a projecting male portion. A flexible and distortable adaptor member, which may be a rubber adaptor is removably fitted over the projecting male portion of the fitting and the adaptor and male projecting portion are sealingly connected together. The adaptor member has on opening therethrough into which the projecting male portion is fitted. The adaptor is of substantial height with one end portion being wider than the other end portion thus making the main body of the adaptor conical. The wider end of the end portion of the adaptor may be dished and the adaptor sealingly connects with a second conduit to direct fluid under pressure into said second conduit. The projecting male portion on the fitting may carry a check valve cage on the end thereof with a ball therein to seat on the end of the projecting male portion to serve as a check valve. As a further modification, there may be mounted a cage member within the opening in the adaptor with a ball resting on the cage member which ball seats on the end of the projecting male portion when assembled in the adaptor to serve as a check valve to prevent back flow.

With these and other objects in view, my invention consists in the construction, arrangement and combination of the various parts of my device, whereby the objects contemplated are attained as hereinafter more fully set forth, pointed out in my claims and illustrated in the accompanying drawing, in which:

Figure 1 is a view partly in elevation and partly in section showing the coupling member connected between a faucet and sink drain.

Figure 2 is an elevational view showing the coupling member connected to a faucet and a drain with the coupling member being of substantial length.

Figure 3 is a view partly in elevation and partly in section showing the adaptor end of the coupling member with one type of check valve therein.

Figure 4 is a view partly in elevation and partly in section showing the adaptor end of the coupling member with one type of check valve therein.

In carrying forward the invention there is shown a sink 1 in Figure 1 having a faucet 2 connected with a water supply conduit. A drain 3 is in the bottom of the sink and connects into a second conduit or sewer pipe 4. A coupling member 5 having a flexible hose section 6 connects to the faucet member 2 or water supply conduit by means of a coupling member 7. The coupling member 7 has a rubber gasket therein which is forced against the faucet end by the water under pressure to make a seal with the faucet end. The opposite end of the coupling member 5 has a projecting male coupling member 8 (best seen in Figure 3) connected to the end of the flexible hose 6 by screw thimble arrangement 9.

An adaptor 10 which is flexible and distortable, and may be of rubber, has an opening 11 therethrough from top to bottom which opening 11 receives the projecting male portion 8 of the fitting. As can readily be seen from Figure 3 the adaptor 10 is of substantial height and the bottom 12 is of a narrower width than the top 13. The side portion 14 of the main body of the adaptor is therefore conical.

Figure 1 shows the coupling member used to flush an obstruction from a sewer 4 connected to a sink 1. The drain 3 of the sink 1 is located in the bottom of the sink away from the side edges, but the adaptor in this instance is used as a male member and is entered into the sink drain 3. The operator first slips coupling 7 over faucet 2 and holds adaptor 10 into sink drain 3. The adaptor 10 being of rubber; flexible and distortable; and of conical shape, becomes wedged sealingly into drain opening 3. The faucet 2 is opened and water under pressure flows through flexible hose 6 into sewer conduit 4. The operator continues to press and hold adaptor 10 into drain opening 3 during the flushing operation.

Figure 2 shows the adaptor 10 reversed on the projecting male member 8. A faucet 2, similar to the faucet in Figure 1 is shown coupled to a flexible hose 6 by screw thimble 15. The faucet 2 may be located outside a building and the flexible hose 6 may be of substantial length. A drain 16 is shown, which may be a floor drain, any outdoor sewer or any conduit from which it is desirable to remove an obstruction or test a conduit for leaks. Drain 16 connects into conduit 17. In the operation of the coupling member in this instance, the adaptor 10 is reversed on the projecting male member 8 so that the top or widest portion 13 of Figure 3 is downward now. As clearly seen in Figure 3 the top portion 13 is dished or sloped inwardly so that the outer edges of adaptor 10 on top portion 13 will contact a flat surface first. The adaptor 10 is placed over drain 16 as in Figure 2, covering the drain 16 and the operator applies pressure to adaptor 10 to force or distort the rubber downwardly, hence under pressure, the whole of the top portion 13 touches the surface 18 outlining drain 16 and is in sealing engagement with the surface 18. For the coupling member to be used in this fashion, the drain opening 16 must be spaced from the sides of the sink to allow the adaptor 10 to seat flush with the surface 18 of the sink.

In some instances, state and city laws will require a check valve in the coupling member to prevent a back flow through the coupling member. If the situation should occur where fire engine pumps hook on to fire hydrants and the coupling member be hooked on to a faucet and sink drain, there would be a possibility of a backflow from the sink conduit into a water supply line.

Figure 3 shows a cage 19 attached to the projecting male portion 8 of the fitting member with a ball 20 within the cage 19. The cage 19 may be integral and of the same material as the projecting male portion 8 or may be a separate member attached to the projecting male portion 8. If back pressure occurs, the ball 20 will be lifted upwardly into sealing engagement with the end portion of projecting male portion 8.

Figure 4 shows a modification of a check valve to prevent back pressure wherein a cage member 21 is mounted in opening 11 in adaptor 10. The cage member 21 has prongs 22 which dig into the adaptor 10 defining opening 11 and prevent removal of the cage member 21 by movement downwardly. A ball 23 is seated on cage member 21 and projecting male portion 8 is entered into opening 11 above the ball 23. The ball 23 will seat on the bottom of the projecting male member 8 if back pressure occurs. If it is desired to reverse the adaptor 10, the cage member 21 may be pushed upwardly out of the opening 11, the adaptor 10 reversed and the cage 21 entered from the opposite end. The ball is slipped into opening 11 and rests on top of cage member 21 after which the projecting male portion 8 is fitted into place.

Some changes may be made in the construction and arrangement of the parts of my device without departing from the real spirit and purpose of my invention, and it is my intention to cover by my claims any modified forms of structure or use of mechanical equivalent, which may be reasonably included within their scope.

I claim:

A coupling member to conduct a fluid under pressure from one conduit to a second conduit comprising a flexible hose, means on one end of the flexible hose to join the coupling member to the first conduit supplying fluid under pressure, a fitting having a projecting male portion connected to the other end of the flexible hose, a rubber adaptor member having an opening therethrough to be received by the projecting male portion of the fitting, said rubber adaptor being of substantial height with one end portion being wider than the other end portion and the sidewall of the adaptor being conical, the wider end portion of the adaptor being dished to seal with a flat surface surrounding an opening leading to a second conduit, said conical side wall adapted to seal with an opening leading to a second conduit and said rubber adaptor being reversible on the fitting.

GLENN A. NORMAN.

REFERENCES CITED

The following references are of record in the file of this patent:

UNITED STATES PATENTS

| Number | Name | Date |
|--------|------|------|
| 387,961 | Ryan | Aug. 14, 1888 |
| 937,458 | Mulherin | Oct. 19, 1909 |
| 1,011,797 | Howell | Dec. 12, 1911 |
| 1,558,161 | Gunderson | Oct. 20, 1925 |
| 1,983,600 | Christie | Dec. 11, 1934 |
| 2,349,435 | Keefe | May 23, 1944 |